United States Patent Office 3,461,121
Patented Aug. 12, 1969

3,461,121
PRODUCTION OF N-ACYLETHIONIMIDES
Harry Distler, Ludwigshafen (Rhine), Germany, assignor to Badische Anilin- & Soda-Fabrik Aktiengesellschaft, Ludwigshafen (Rhine), Germany
No Drawing. Filed Jan. 12, 1967, Ser. No. 608,740
Claims priority, application Germany, Jan. 20, 1966, B 85,474
Int. Cl. C07d 95/00
U.S. Cl. 260—243          8 Claims

ABSTRACT OF THE DISCLOSURE

This invention relates to N-acyl ethionimides which have not hitherto been described and which are obtained by reacting carbyl sulfates derived α-olefins with nitriles, if desired in the presence of inert solvents. The carbyl sulfates may be prepared from sulfur trioxide and α-olefins in situ. The N-acyl ethionimides yield carboxylic acid amides and α,β-unsaturated sulfonates on hydrolysis. The N-acylethionimides are suitable for the production of unsaturated sulfonic acids from which polymers are produced which can be used as flocculating agents or thickeners.

---

This invention relates to new N-acyl ethionimides and to the production of the said substances.

It is an object of the present invention to provide a method of producing N-acyl ethionimides in high yields. Other objects will be apparent from the following detailed description.

In accordance with this invention these objects are achieved and N-acyl ethionimides of the general formula

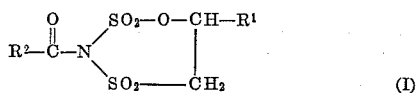

where $R^1$ is hydrogen or an aliphatic hydrocarbon radical and $R^2$ is hydrogen, an aliphatic, cycloaliphatic, araliphatic or aromatic radical or the group

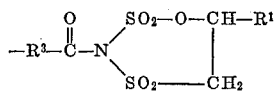

where $R^1$ has the above meanings and $R^3$ is a phenylene radical or an alkylene radical having from 1 to 10 carbon atoms are obtained by reacting carbyl sulfates of the general formula

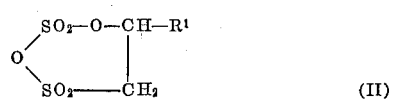

where $R^1$ has the meanings given above, with nitriles of the formula $R^4$—CN where $R^4$ is hydrogen, an aliphatic, cycloaliphatic, araliphatic or aromatic radical, or a group —$R^3$—CN where $R^3$ has the meanings given above.

In the preferred compounds of Formulas I and II $R^1$ is hydrogen or an alkyl radical, especially a linear alkyl radical having 1 to 16 carbon atoms, such as a methyl, ethyl, isopropyl, octyl, decyl or palmitoyl radical. The carbyl sulfates II are prepared in conventional manner by reacting 2 moles of sulfur trioxide with 1 mole of an α-olefin, such as ethylene, propylene, butene-(1), octene-(1), decene-(1) or dodecene-(1). Carbyl sulfate prepared from ethylene is particularly important. The compounds of the formula II may also be prepared from α-olefins and sulfur trioxide in situ, especially when using liquid α-olefins.

In the preferred compounds I and II $R^2$ and $R^4$ are hydrogen or aliphatic, cycloaliphatic, araliphatic or aromatic radicals having up to 16 carbon atoms, especially hydrogen or alkyl, alkenyl, cycloalkyl, aralkyl, aralkenyl or aryl radicals having up to 16, preferably up to 8, carbon atoms, e.g. methyl, ethyl, vinyl, isopropyl, isopropenyl, dodecyl, cyclohexyl, cyclohexenyl, benzyl, phenyl or naphthyl radicals. The radicals $R^2$ and $R^4$ may also have substituents that are inert under the reaction conditions, e.g. 1 or 2 halogen atoms such as chlorine or bromine atoms, ester groups derived from alkanols having 1 to 4 carbon atoms, nitro groups or alkyl radicals attached via ether bridges and having 1 to 4 carbon atoms. It is also possible to use nitriles having two nitrile groups in the molecule. The reaction products I then contain the ethionimide grouping twice. Nitriles containing two nitrile groups in the molecule are derived from phenylene radicals or alkylene radicals having 1 to 10 carbon atoms. In this case $R^3$ in the formula representing N-acyl ethionimides has the same meaning. Nitriles III amenable to the reaction include acetonitrile, propionitrile, butyronitrile, lauronitrile, acrylonitrile, methacrylonitrile, oleonitrile, cyclohexanecarboxylic acid nitrile, cyclohexen-(1)-carboxylic acid nitrile, phenylacetonitrile, cinnamonitrile, benzonitrile, succinonitrile, adiponitrile, sebaconitrile and terephthalonitrile.

The carbyl sulfate is advantageously reacted with the nitrile in equivalent amounts, i.e. one mole of carbyl sulfate per equivalent of nitrile. It is also possible to add either component in an excess of preferably up to 20 mole percent.

The reaction usually proceeds at temperatures of from 0 to 150° C., the preferred range being from 30 to 100° C.

When using solid nitriles it is expedient to carry out the reaction in a solvent. Suitable solvents are for example chlorinated hydrocarbons which are liquid above 20° C., such as carbon tetrachloride or chlorobenzene, ethers such as tetrahydrofuran or dioxane, and also nitrobenzene. When liquid nitriles are used, an excess of nitrile may serve as solvent.

The process of the invention may for example be carried out by placing a nitrile, preferably dissolved in a solvent, in a stirred vessel and adding an equivalent amount of carbyl sulfate, preferably in liquid form. Alternatively equivalent amounts of sulfur trioxide and α-olefins may be separately added instead of the carbyl sulfate. Under the said conditions the reaction is usually complete after 6 to 8 hours. Any solvent used is then distilled off. The N-acyl ethionimide is obtained as residue in the form of a slowly crystallizing syrup.

The N-acyl ethionimides obtainable by the process of the invention are valuable intermediates for pesticides. They may also be used to manufacture acid amides and α,β-unsaturated sulfonates by hydrolysis with alkalies. α,β-unsaturated sulfonates are well-known monomers.

The invention is further illustrated by the following examples in which the parts are by weight.

Example 1

82 parts of acetonitrile is placed in a stirred vessel and then 376 parts of liquid carbyl sulfate is added in the course of an hour. The reaction mixture is maintained at 40 to 50° C. for approx. 4 to 5 hours. The acetyl ethionimide is obtained as a viscous syrup which slowly crystallizes on standing. The product is very hygroscopic and has an iodine number (RSH addition method) of 199. The yield is 98% of the theory.

Example 2

376 parts of liquid carbyl sulfate is added in the course of an hour to 106 parts of acrylonitrile. The reaction mixture is heated for 6 hours at approx. 50 to 60° C. The acrylyl ethionimide crystallizes on cooling. The product is very hygroscopic and has an iodine number (RSH addition method) of 200. The yield is 95% of the theory.

Example 3

210 parts of methylcarbyl sulfate is added in portions in the course of an hour to 103 parts of benzonitrile. The reaction mixture is slowly heated to 50 to 60° C. during three hours and stirring is continued for a few hours. the product benzoylmethyl ethionimide is hydroscopic and has an iodine number (RSH addition method) of 78. The yield is 96% of the theory. Benzamide and the sodium salt of $\beta$-methyl vinylsulfonic acid are obtained by hydrolysis with caustic soda solution.

Example 4

140 parts of decene-(1) and 41 parts of acetonitrile are placed in a stirred vessel at 0° C. 160 parts of $SO_3$ is passed in as a 5 vol. percent mixture with nitrogen while cooling and with efficient distribution. The temperature is then allowed to rise to 50° C. and stirring is continued for two hours. The product acetyl (octylethionic acid( imide has an iodine number (RSH method) of 60. The yield is approx. 80% of the theory. Acetamide and sodium $\beta$-octyl vinyl sulfonate are obtained by hydrolysis with caustic soda solution.

Example 5

376 parts of liquid carbyl sulfate is added in the course of an hour to 108 parts of adiponitrile and the procedure of Example 1 is followed. The product adipoyl-bis-ethionimide has an iodine number (RSH) of 90. The yield is 85% of the theory. Adipamide and vinyl sulfonate are obtained by hydrolysis with caustic soda solution.

The use of the substances obtainable according to the invention may be illustrated by the following example.

Example 6

241 parts of acrylyl ethionimide is hydrolyzed for two hours at 60° C. with 125 parts of sodium hydroxide dissolved in 2000 parts of water. The excess sodium hydroxide is neutralized by adding a little acid. The acrylamide and sodium vinyl sulfonate produced by hydrolysis are polymerized together at 75 to 80° C. in the aqueous solution to which 2 parts of potassium persulfate has been added. After 6 hours a highly viscous solution of a copolymer of acrylamide and sodium vinyl sulfonate is obtained which is suitable as a thickener for solutions and for flocculating finely divided solids in aqueous suspensions.

We claim:

1. N-acylethionimide of the formula $$R^2-\overset{O}{\underset{\|}{C}}-N\overset{SO_2-O-CH-R'}{\underset{SO_2\underline{\quad\quad}CH_2}{\diagdown}} \quad (I)$$

where R' is hydrogen or alkyl of 1 to 16 carbon atoms and R² is hydrogen, alkyl or alkenyl of up to 8 carbon atoms, cyclohexyl, benzyl, phenyl or naphthyl radical, or the group $$-R^3-\overset{O}{\underset{\|}{C}}-N\overset{SO_2-O-CH-R'}{\underset{SO_2\underline{\quad\quad}CH_2}{\diagdown}}$$

where R' has the above meanings and R³ is phenylene or alkylene of up to 10 carbon atoms.

2. A process for the production of an N-acylethionimide of the formula $$R^2-\overset{O}{\underset{\|}{C}}-N\overset{SO_2-O-CH-R'}{\underset{SO_2\underline{\quad\quad}CH_2}{\diagdown}} \quad (I)$$

where R' is hydrogen or alkyl of from 1 to 16 carbon atoms and R² is hydrogen, alkyl or alkenyl of up to 8 carbon atoms, cyclohexyl, benzyl, phenyl or naphthyl radical, or the group $$-R^3-\overset{O}{\underset{\|}{C}}-N\overset{SO_2-O-CH-R'}{\underset{SO_2\underline{\quad\quad}CH_2}{\diagdown}}$$

where R' has the above meanings and R³ is phenylene or alkylene radical of up to 10 carbon atoms, which comprises reacting carbyl sulfates of the formula $$O\overset{SO_2-O-CH-R'}{\underset{SO_2\underline{\quad\quad}CH_2}{\diagdown}} \quad (II)$$

where R' has the meanings given above, with nitriles of the formula $$R^4-CN \quad (III)$$

where R⁴ is hydrogen, alkyl or alkenyl of up to 8 carbon atoms, cyclohexyl, benzyl, phenyl or naphthyl radical, or a group —R³—CN where R³ has the meanings given above, at temperatures of from 0 to 150° C.

3. A process as claimed in claim 2 wherein hydrogen cyanide is used as the nitrile of the formula R⁴—CN.

4. A process as claimed in claim 2 wherein the carbyl sulfates are prepared from $\alpha$-olefins and sulfur trioxide in situ.

5. A process as claimed in claim 2 wherein temperatures of from 30 to 100° C. are used.

6. A process as claimed in claim 2 wherein carbyl sulfates and nitriles are reacted in equivalent amounts.

7. A process as claimed in claim 2 wherein solvents are used which are inert under the reaction conditions.

8. A process as claimed in claim 2 wherein liquid nitriles are used in excess as solvents.

References Cited

UNITED STATES PATENTS

| | | | |
|---|---|---|---|
| 2,784,204 | 3/1957 | Heyna et al. | 260—243 XR |
| 2,917,512 | 12/1959 | Helferich | 260—243 |
| 2,956,997 | 10/1960 | Teufel | 260—243 |

HENRY R. JILES, Primary Examiner

J. M. FORD, Assistant Examiner

U.S. Cl. X.R.

252—355; 260—88, 89, 327, 513, 557, 558, 561